(12) United States Patent
Torii

(10) Patent No.: US 8,392,599 B2
(45) Date of Patent: Mar. 5, 2013

(54) NETWORK DEVICE, NETWORK DEVICE MANAGEMENT APPARATUS, NETWORK DEVICE CONTROL METHOD, NETWORK DEVICE MANAGEMENT METHOD, PROGRAM, AND STORAGE MEDIUM

(75) Inventor: Minoru Torii, Machida (JP)

(73) Assignee: Canon Kabushiki Kaisha (JP)

( * ) Notice: Subject to any disclaimer, the term of this patent is extended or adjusted under 35 U.S.C. 154(b) by 1183 days.

(21) Appl. No.: 11/938,982

(22) Filed: Nov. 13, 2007

(65) Prior Publication Data
US 2010/0023643 A1 Jan. 28, 2010

(30) Foreign Application Priority Data
Nov. 13, 2006 (JP) ................................ 2006-307225

(51) Int. Cl.
*G06F 15/16* (2006.01)
(52) U.S. Cl. ........................ 709/232; 709/221
(58) Field of Classification Search .................. 709/221, 709/232
See application file for complete search history.

(56) References Cited

U.S. PATENT DOCUMENTS

| | | | | |
|---|---|---|---|---|
| 5,950,195 | A * | 9/1999 | Stockwell et al. ...................... | 1/1 |
| 6,131,125 | A * | 10/2000 | Rostoker et al. .............. | 709/250 |
| 6,978,319 | B1 * | 12/2005 | Rostoker et al. .............. | 709/250 |
| 7,716,350 | B2 * | 5/2010 | Howarth et al. .............. | 709/229 |
| 7,739,373 | B2 * | 6/2010 | Ohnishi ......................... | 709/224 |
| 2002/0091941 | A1 * | 7/2002 | Challener et al. ............. | 713/201 |
| 2006/0031888 | A1 * | 2/2006 | Sparrell .......................... | 725/78 |
| 2006/0117084 | A1 * | 6/2006 | Morozumi et al. ............ | 709/203 |
| 2006/0123092 | A1 * | 6/2006 | Madams et al. ............... | 709/206 |
| 2006/0129700 | A1 * | 6/2006 | Bopardikar ..................... | 710/2 |
| 2006/0137005 | A1 * | 6/2006 | Park ............................... | 726/21 |
| 2006/0184510 | A1 * | 8/2006 | Nishio ............................ | 707/3 |
| 2008/0095374 | A1 * | 4/2008 | Schreyer ....................... | 380/282 |
| 2009/0113522 | A1 * | 4/2009 | Crassous et al. .................. | 726/4 |

FOREIGN PATENT DOCUMENTS

| | | |
|---|---|---|
| JP | 2003-006133 A | 1/2003 |
| JP | 2004-38956 A | 2/2004 |
| JP | 2004362594 A | 12/2004 |
| JP | 2006-059011 A | 3/2006 |

OTHER PUBLICATIONS

Mike Fenelon "Microsoft Standard TCP/IP Port Monitor Futures"; ftp://ftp.pwg.org/pub/pwg/BOFs/port/TCPMonPWG.ppt; Windows Digital Document Platforms & Solutions Group.
Office Action in corresponding Japanese Patent Application No. 2006-307225, issued Aug. 22, 2011.

* cited by examiner

*Primary Examiner* — Brian P Whipple
(74) *Attorney, Agent, or Firm* — Rossi, Kimms & McDowell LLP

(57) ABSTRACT

A network device includes a communicator which communicate with an information processing apparatus on a network by using a first communication protocol requiring authentication and a second communication protocol requiring no authentication, a setting unit which sets the operation mode of the communicator so as to communicate with an object necessary for Plug and Play by using the second communication protocol and communicate with an object other than the object necessary for Plug and Play by using the first communication protocol, and a determination unit which determines, using identification information to identify configuration information contained in information received from the information processing apparatus, whether the configuration information is necessary for the Plug and Play.

14 Claims, 19 Drawing Sheets

FIG. 7

MIB GROUP 1
sysDescr
hrDeviceStatus
hrPrinterStatus
hrPrinterDetectedErrorStatus
hrMemorySize
hrStorageTypes
prtMediaPathType MIB GROUP 1
ppmGeneralNaturalLanguage
ppmGeneralNumberOfPrinters
ppmGeneralNumberOfPorts
ppmPrinterName
ppmPrinterIEEE1284DeviceId
ppmPrinterNumberOfPorts
ppmPrinterPreferredPortIndex
ppmPrinterHrDeviceIndex
ppmPrinterSnmpCommunityName
ppmPrinterSnmpQueryEnabled
ppmPortenabled
ppmPortName
ppmPortServiceNameOrURI
ppmPortProtocolType
ppmPortProtocolTargetPort
ppmPortProtocolAltSourceEnabled
ppmPortPrtChannelIndex
ppmPortLprByteCountEnabled

FIG. 10B
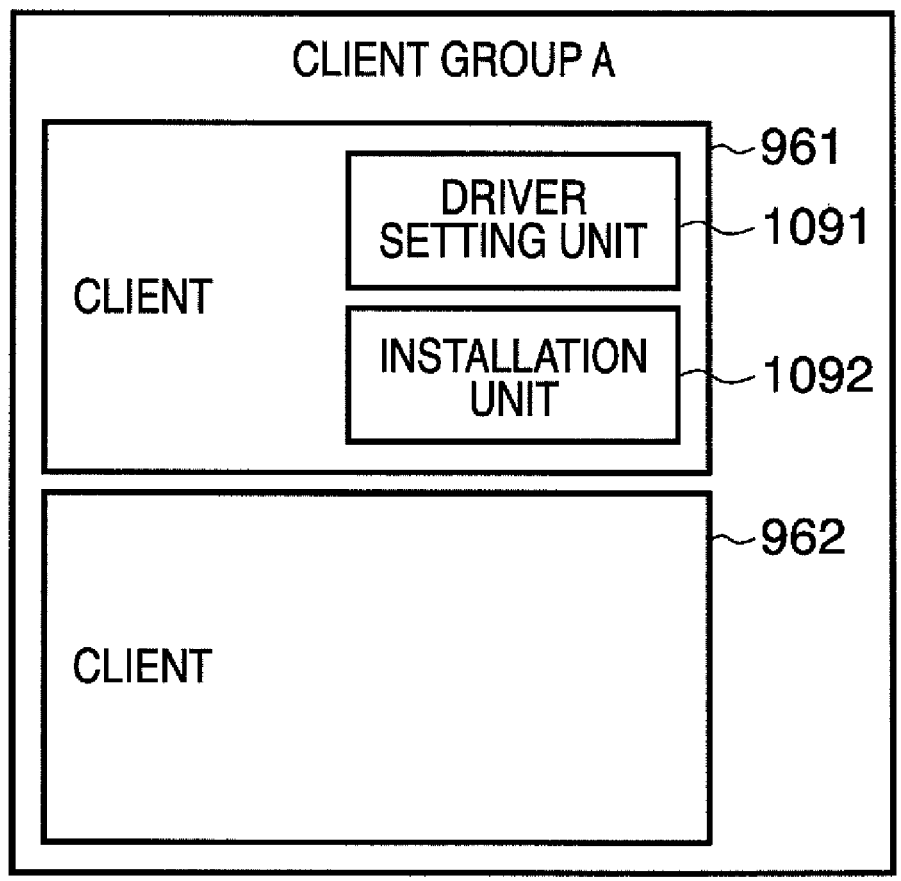
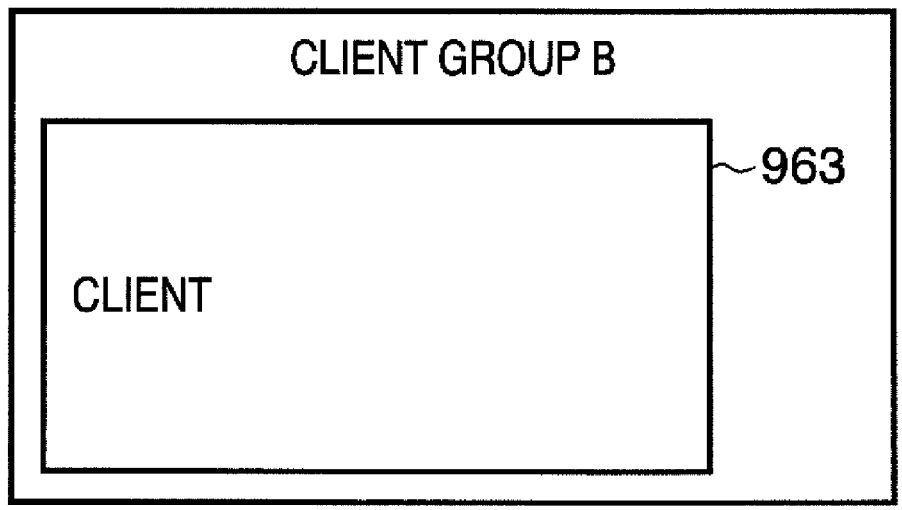

FIG. 10C
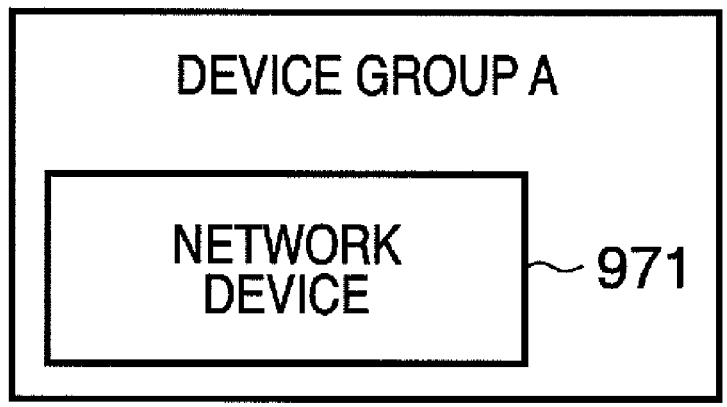
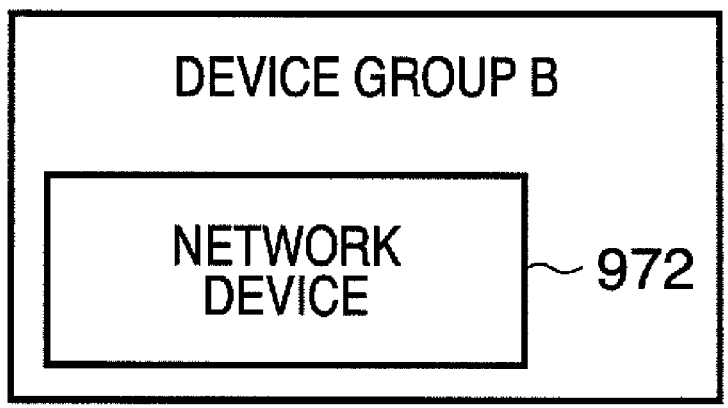
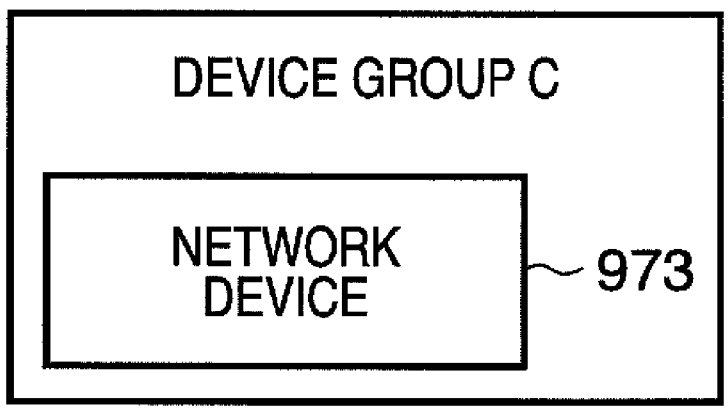

FIG. 14
PRINTER AND FAX
iR 1234
0
READY
iR 1235
0
READY
iR 1236
0
READY

FIG. 15

CONFIGURATION OF PREPARATION TCP / IP PORT MONITOR

PORT SETTING

USER NAME : IP 172.24.90.123

PRINTER NAME OR IP ADDRESS : 172.24.90.123

PROTOCOL
- ○ Raw
- ⦿ LPR

Raw SETTING
PORT NUMBER : 9100

LPR SETTING
QUEUE NAME : XXXXXX

☐ ENABLE LPR BYTE COUNT

☑ ENABLE SNMP STATUS

COMMUNITY NAME : public

SNMP DEVICE INDEX : 1

[ OK ]  [ CANCEL ]

NETWORK DEVICE, NETWORK DEVICE MANAGEMENT APPARATUS, NETWORK DEVICE CONTROL METHOD, NETWORK DEVICE MANAGEMENT METHOD, PROGRAM, AND STORAGE MEDIUM

BACKGROUND OF THE INVENTION

1. Field of the Invention

The present invention relates to a network device and network device management technique.

2. Description of the Related Art

SNMPv1 (Simple Network Management Protocol, SNMP version 1) is a protocol to manage a network device. Network device management using the SNMPv1 protocol is very popular because of simple specifications and implementation and is employed by various kinds of network devices.

However, since the SNMPv1 is poor in security, SNMPv3 capable of protecting an SNMP packet by communication encrypted using a secret key is standardized. Details of SNMPv3 are defined by RFC3411, RFC3412, RFC3413, RFC3414, RFC3415, RFC3416, and the like.

For more convenient and simple use of network devices, various protocols and architectures have been proposed. For example, Japanese Patent Laid-Open Nos. 2004-038956 and 2004-362594 disclose an arrangement for searching for a network device to provide a service and an arrangement for automatically setting up, e.g., an application and operation system to control network devices.

A plurality of corporations and standardization organizations are fostering specifications development to extend Plug and Play, which has been applied to local I/O-connected devices, to network devices.

For example, an OS has a simple PnP (Plug and Play) which automatically installs the driver of a printer connected to a network and reflects the configuration information of the printer on the driver setting. More specifically, the Standard TCP/IP Port Monitor of the OS acquires an IEEE1284 device ID from a device with Port Monitor MIB by using the SNMPv1 protocol. After acquiring the device ID, the OS selects a printer driver and installs it. After installation, the Standard TCP/IP Port Monitor acquires device information by using the SNMPv1 protocol and reflects the information on the driver setting.

However, a device having the SNMPv3 protocol and set to use only it cannot use the PnP function. For this reason, the user must manually select a printable driver and install it. Additionally, after driver installation, he/she must manually set the device configuration information necessary for driver setting on the UI of the driver.

SUMMARY OF THE INVENTION

The present invention has been made in consideration of the above-described problems, and has as its object to provide a network device which allows to use a simple PnP function in a specific OS by using an SNMPv3 operation mode corresponding to the PnP function, and a network device management technique.

According to one aspect of the present invention, there is provided a network device comprising: a communicator adapted to communicate with an information processing apparatus on a network by using a first communication protocol requiring authentication and a second communication protocol requiring no authentication; a setting unit adapted to set an operation mode of the communicator so as to communicate with an object necessary for Plug and Play by using the second communication protocol and communicate with an object other than the object necessary for Plug and Play by using the first communication protocol; and a determination unit adapted to determine, using identification information to identify configuration information contained in information received from the information processing apparatus, whether the configuration information is necessary for the Plug and Play.

According to another aspect of the present invention, there is provided a network device comprising: a communicator adapted to communicate with an information processing apparatus on a network by using a first communication protocol and a second communication protocol; a determination unit adapted to determine whether a request received from the information processing apparatus requests configuration information related to Plug and Play; and a communication controller adapted to transmit, to the information processing apparatus which has transmitted the request, configuration information by using the second communication protocol when the determination unit determines that the request received from the information processing apparatus requests the configuration information related to the Plug and Play, and transmit, to the information processing apparatus, no response to the request when the determination unit determines that the request received from the information processing apparatus does not request the configuration information related to the Plug and Play.

According to still another aspect of the present invention, there is provided a network device management apparatus comprising: an authentication information setting unit adapted to set authentication information related to a first communication protocol; an operation mode setting unit adapted to set an operation mode so as to communicate with an object necessary for Plug and Play by using the second communication protocol and communicate with an object other than the object necessary for Plug and Play by using the first communication protocol; and a network device setting unit adapted to set, in a network device, settings by the authentication information setting unit and the operation mode setting unit.

According to yet another aspect of the present invention, there is provided a network device control method comprising the steps of: communicating with an information processing apparatus on a network by using a first communication protocol requiring authentication and a second communication protocol requiring no authentication; setting an operation mode in the communicating step so as to communicate with an object necessary for Plug and Play by using the second communication protocol and communicate with an object other than the object necessary for Plug and Play by using the first communication protocol; and determining, using identification information to identify configuration information contained in information received from the information processing apparatus, whether the configuration information is necessary for the Plug and Play.

According to still yet another aspect of the present invention, there is provided a network device control method comprising the steps of: communicating with an information processing apparatus on a network by using a first communication protocol and a second communication protocol; determining whether a request received from the information processing apparatus requests configuration information related to Plug and Play; and transmitting, to the information processing apparatus which has transmitted the request, configuration information by using the second communication protocol when it is determined in the determining step that the request received from the information processing apparatus requests the configuration information related to the Plug and Play, and transmitting, to the information processing apparatus, no response to the request when it is determined in the determining step that the request received from the information processing apparatus does not request the configuration information related to the Plug and Play.

According to yet still another aspect of the present invention, there is provided a network device management method comprising the steps of: setting authentication information related to a first communication protocol; setting an operation mode so as to communicate with an object necessary for Plug and Play by using the second communication protocol and communicate with an object other than the object necessary for Plug and Play by using the first communication protocol; and setting, in a network device, settings in the authentication information setting step and the operation mode setting step.

According to the present invention, a user can use a simple PnP function in a specific OS by using an SNMPv3 operation mode corresponding to the PnP function.

Alternatively, with the simple PnP function, the user can use a function of automatically installing a driver and automatically reflecting device configuration information on the driver setting.

Further features of the present invention will become apparent from the following description of exemplary embodiments (with reference to the attached drawings).

BRIEF DESCRIPTION OF THE DRAWINGS

FIG. 7 is a view showing a list of MIB objects to which the image forming apparatus responds in a simple PnP mode;

FIG. 10B is a view showing an example of a list of clients managed in groups;

FIG. 10C is a view showing an example of a list of network devices managed in groups;

FIG. 14 is a view showing an example of a display screen on which MIB objects are reflected; and FIG. 15 is a view showing another example of the display screen on which MIB objects are reflected.

DESCRIPTION OF THE EMBODIMENT

An embodiment of the present invention will be described below. Individual embodiments to be described below will serve to understand various concepts including the superordinate concept, intermediate concept, and subordinate concept of the present invention. The technical scope of the invention is determined by the claims and is not limited to the individual embodiments to be described below.

(Snmpv1 and Snmpv3 Protocols)

Figure 1:
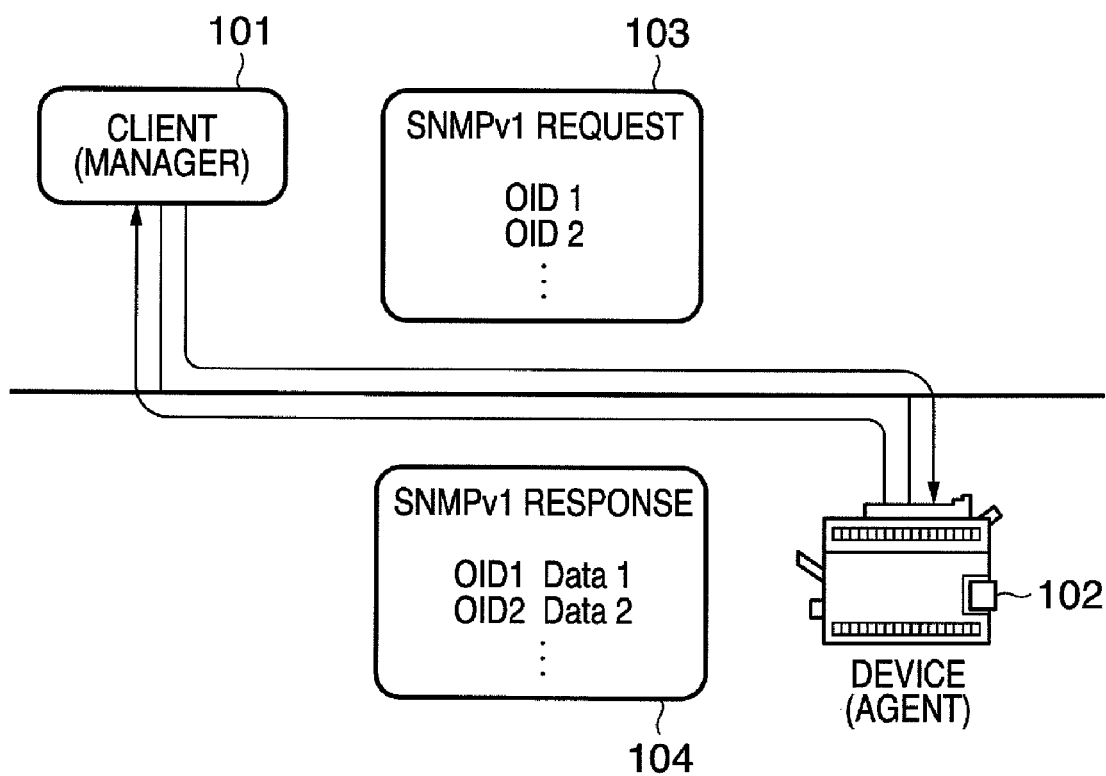
FIG. 1 is a view for explaining device management by the SNMPv1 protocol.

Network device management using the SNMPv1 protocol is executed between a management utility called a manager on the side of a client 101 and a management target device 102 called an agent, both shown in FIG. 1. The agent holds data (MIB information) about the state of its own in the form of a database called MIB (Management Information Base). The manager transmits a device state request 103 to the agent and acquires a response 104 (MIB information) from the agent, thereby managing the device. The SNMPv1 protocol is very popular because of simple specifications and implementation and is incorporated in various kinds of network devices.

Figure 2:
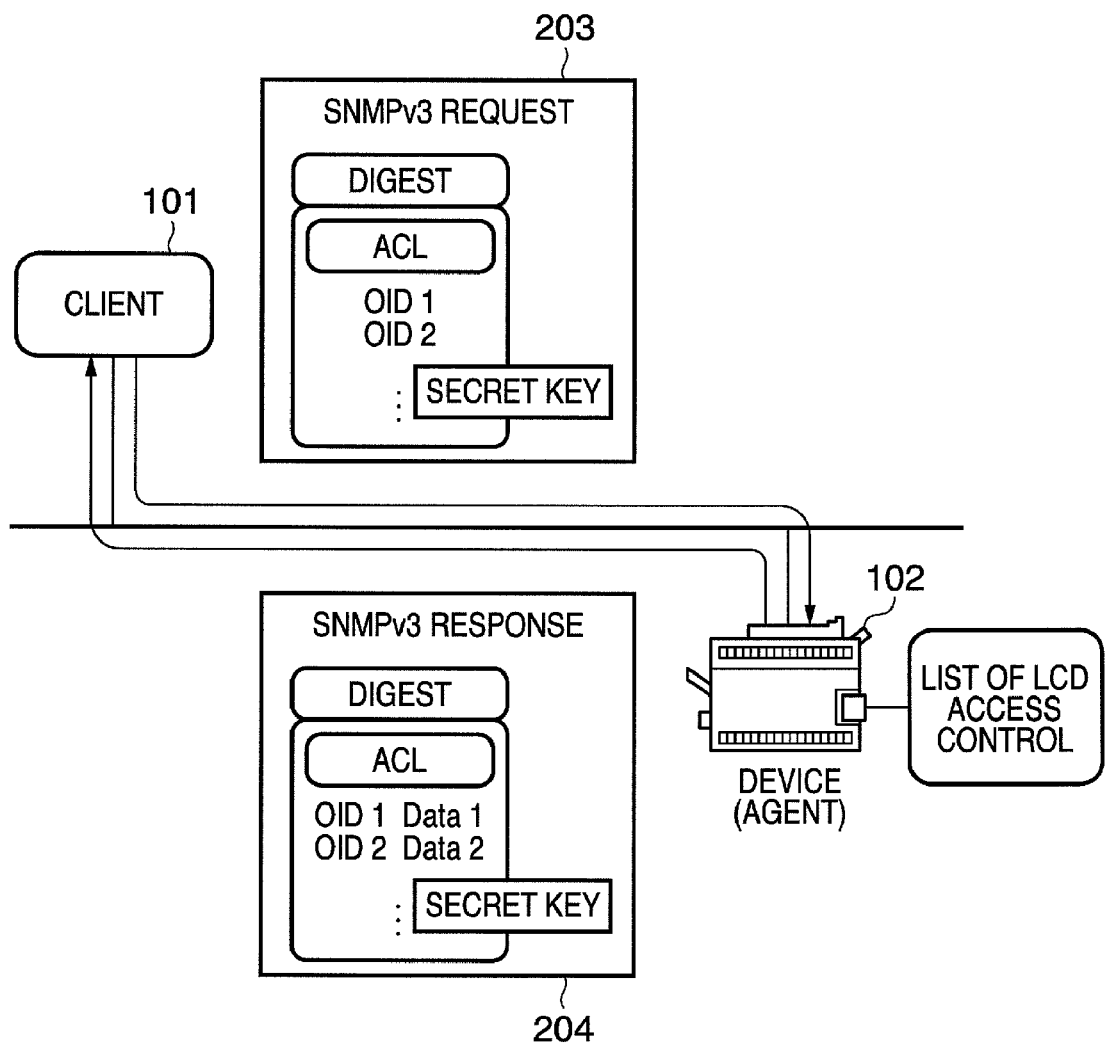
FIG. 2 is a view for explaining device management by the SNMPv3 protocol.
Figure 3:
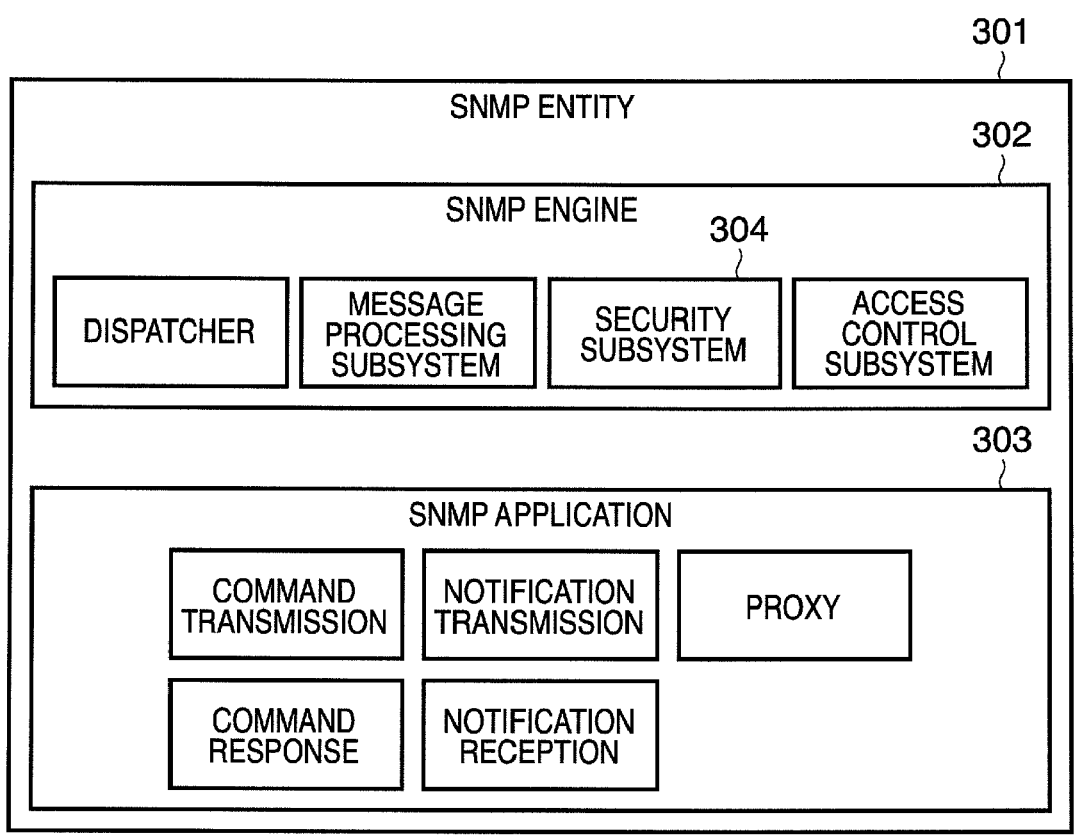
FIG. 3 is a view for explaining an SNMP entity.

However, since the SNMPv1 is poor in security, SNMPv3 capable of protecting an SNMP packet from, e.g., wiretap, spoofing, and alteration by communications (203 and 204) encrypted using a secret key is standardized (FIG. 2). In the SNMPv3, the SNMP manager and SNMP agent in the SNMPv1 are generically called an "SNMP entity" (FIG. 3). An SNMP entity 301 includes an SNMP engine 302 and an SNMP application 303. The SNMP engine 302 is identified on the basis of a unique SNMP engine ID in a single management domain and provides a service for authentication, encrypted message transmission/reception, and access control to management objects. A security subsystem 304 of the SNMP engine 302 executes encryption and authentication.

The SNMPv1 executes authentication on the basis of a community name. However, the SNMPv3 executes user authentication. The security function is also enhanced because the SNMPv3 supports a privacy function (encryption and decryption) the SNMPv1 does not have.

(Arrangement of Network Device)

An image forming apparatus having a scanner function, facsimile function, and printer function will be exemplified as a network device according to the embodiment of the present invention. The present invention is not limited to this. For example, a simple facsimile or simple printer may be used. The printer may be a laser beam printer, inkjet printer, color printer, or monochrome printer.

Figure 5A:
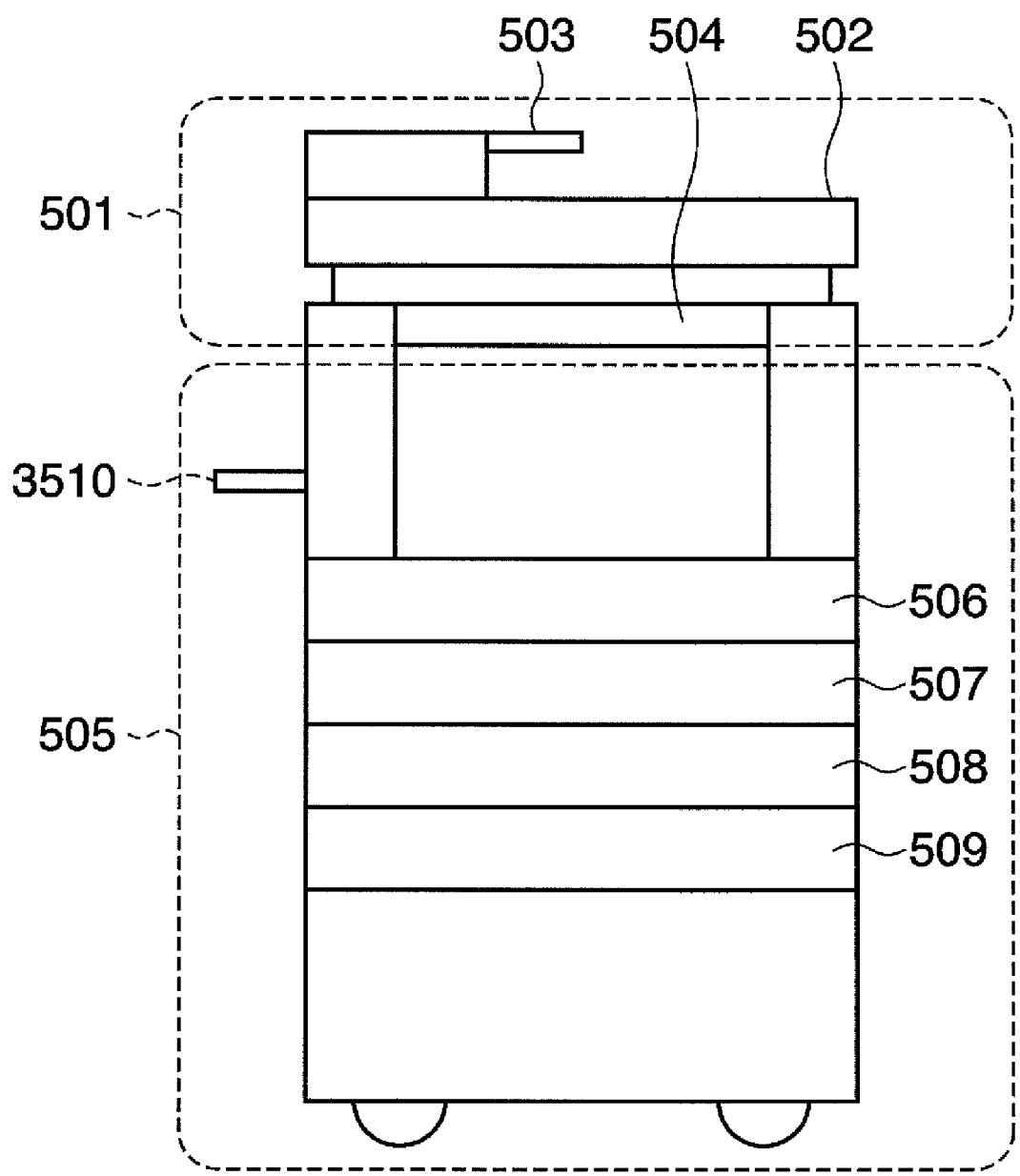
FIG. 5A is a view schematically showing the outer appearance of an image forming apparatus.

FIG. 5A is a view schematically showing the outer appearance of the image forming apparatus. A scanner 501 serving as an image input unit illuminates an image drawn on a document, scans a CCD line sensor (not shown) to read the image, and converts the image data into an electrical signal as raster image data. Document sheets are set on a tray 503 of a feeder 502. When the user input a read start instruction from an operation unit 504, the CPU gives the instruction to the scanner 501. The feeder 502 feeds the document sheets one by one. The document image read operation thus starts. The operation unit 504 has a panel screen that allows network setting. The user can set, e.g., a network protocol to be used and an access right through the panel screen.

A printer 505 serving as an image output unit converts the electrical raster image data into a visible image on paper. There are conversion methods such as an electrophotographic method using a photosensitive drum and an inkjet method which directly prints an image on paper by ink discharged from a small nozzle array. Either method is usable. The print operation starts in accordance with an instruction from the CPU. The printer 505 has a plurality of feed stages to select different paper sizes or different paper orientations and includes paper cassettes 506, 507, 508, and 509 corresponding to the sizes and orientations. A discharge tray 510 receives printed paper sheets.

Figure 5B:
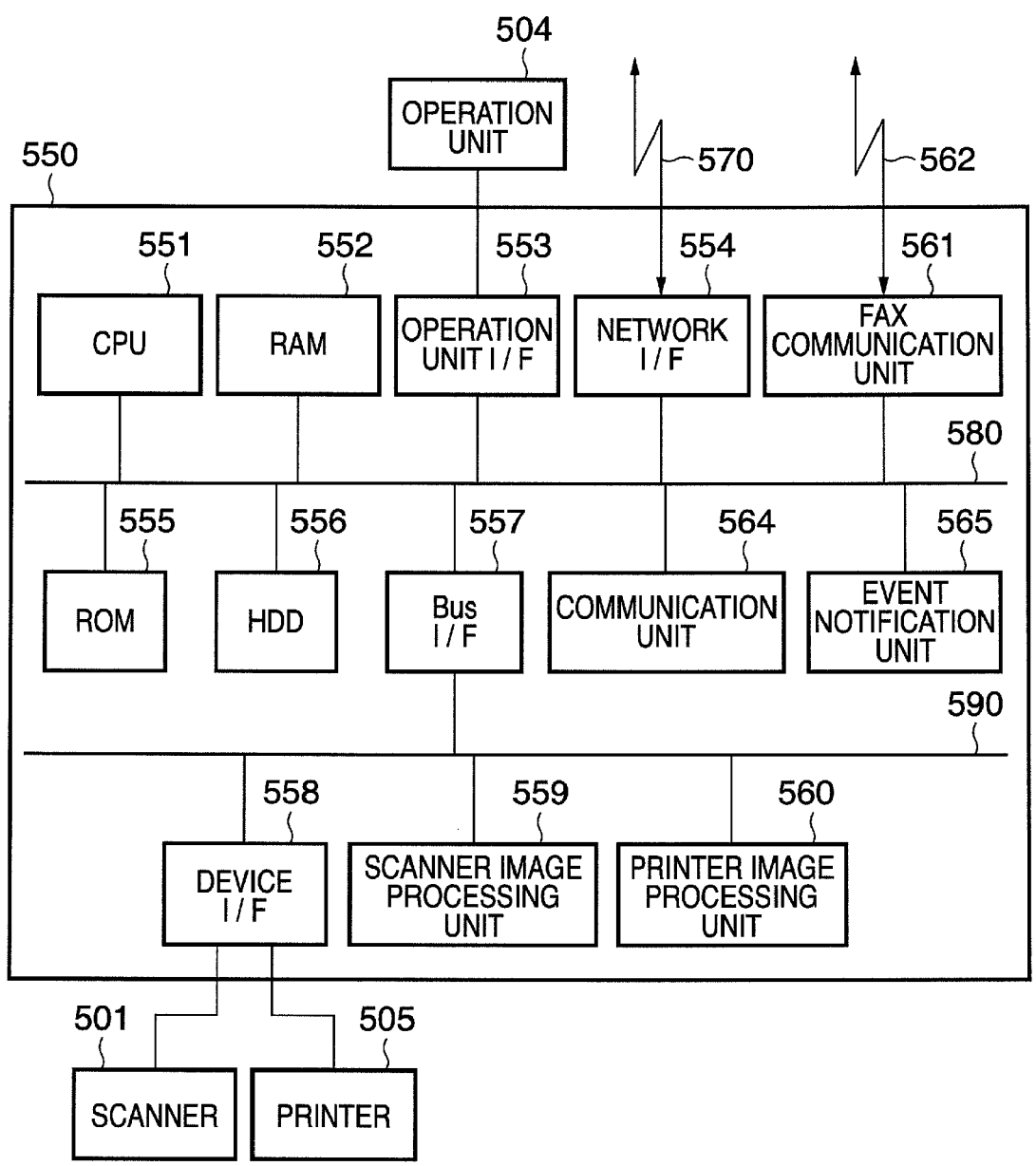
FIG. 5B is a block diagram for explaining the arrangement of the image forming apparatus.

FIG. 5B is a block diagram for explaining the arrangement of the image forming apparatus. A control unit 550 is connected to the scanner 501 serving as an image input unit and the printer 505 serving as an image output unit via a device interface (I/F) 558. The control unit 550 is also connected to a network 570 via a network I/F 554.

The control unit 550 can input and output image information and device information by communication via the device I/F 558 and network I/F 554. A CPU 551 controls the entire image forming apparatus. A RAM 552 serves as a system work memory for the CPU 551 to operate and also serves as an image memory to temporarily store image data. A ROM 555 is a boot ROM which stores the control program of the image forming apparatus (device including the scanner 501 and printer 505). An HDD 556 is a hard disk drive which stores system software and image data.

An operation unit I/F 553 is an interface for the operation unit 504. The operation unit I/F 553 outputs, to the operation unit 504, data to be displayed on it. The operation unit I/F 553 also transmits, to the CPU 551, information that the system user (user) has input from the operation unit 504. The CPU 551 can control the operation of the image forming apparatus on the basis of the information input from the operation unit 504.

The network I/F 554 is connected to the network 570 to input and output image information and device information.

A FAX communication unit 561 is connected to a public network (telephone line or ISDN) 562 to do FAX transmission/reception.

A communication unit 564 can communicate with the client 101 via the network 570 by using a protocol such as SNMPv1 or SNMPv3. An integrated management application 951 (to be described later) can set the communication protocol to be used by the network device.

An event notification unit 565 notifies (event notification) a registered client of various events (e.g., connection to the network 570, power-on, the operation state of the image forming apparatus, and changes in the operation state) that have occurred in the image forming apparatus.

The above-described devices are arranged on a system bus 580.

A Bus I/F 557 connects the system bus 580 to an image bus 590 which transfers image data at a high speed. A scanner image processing unit 559 can correct, manipulate, and edit input image data. A printer image processing unit 560 can correct, manipulate, and edit output image data.

(Arrangement of Server PC)

Figure 9A:
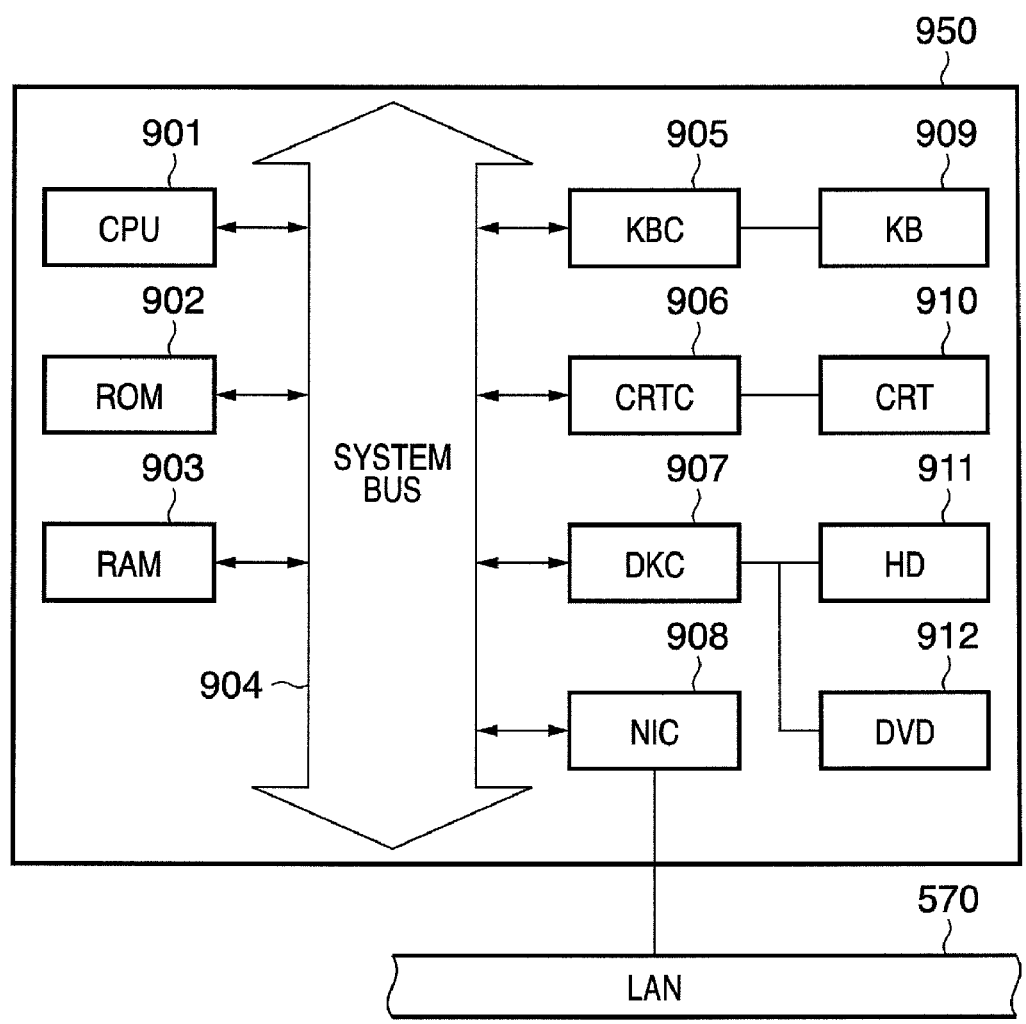
FIG. 9A is a block diagram showing the schematic arrangement of a server PC.
Figure 9B:
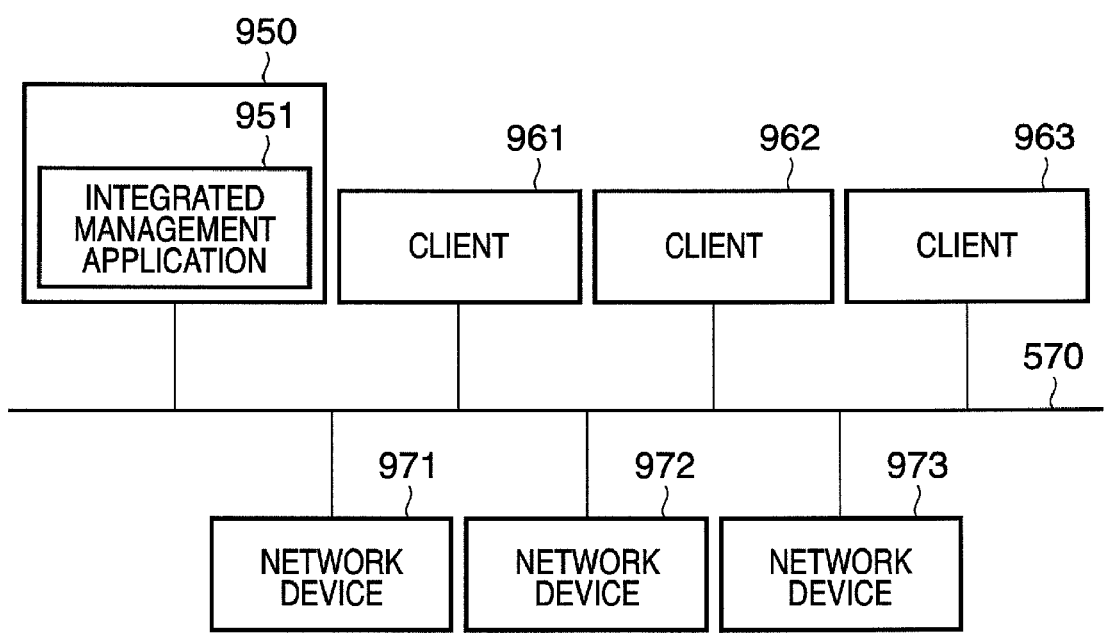
FIG. 9B is a view for explaining the configuration of a network.

FIG. 9A is a block diagram showing the schematic arrangement of a server PC (information processing apparatus) 950 which manages clients 961, 962, and 963 and network devices 971, 972, and 973 on the network 570 shown in FIG. 9B. The server PC 950 can execute the integrated management application 951. The integrated management application 951 will be described later.

Referring to the block diagram in FIG. 9A, a ROM 902 or hard disk (HD) 911 stores the integrated management application 951.

A CPU 901 is the center of hardware control. The CPU 901 executes the integrated management application 951, thereby implementing its functions on the server PC 950. The center of software control is the integrated management application 951. The OS of the server PC 950 is assumed to be, e.g., Windows® XP or Vista (Microsoft). However, the present invention is not limited to this, as a matter of course.

The integrated management application 951 may be stored in a storage medium such as a DVD or CD-ROM and supplied to the server PC 950. In this case, a DVD controller (DVD) 912 shown in FIG. 9A or a DC-ROM drive (not shown) reads out the program codes of the application from the storage medium and installs them in the hard disk (HD) 911.

A RAM 903 functions as the main memory or work area of the CPU 901. A keyboard controller (KBC) 905 controls an instruction input from a keyboard (KB) 909 or a pointing device (not shown). A CRT controller (CRTC) 906 controls display on a CRT display (CRT) 910. A disk controller (DKC) 907 controls access to the hard disk (HD) 911 or DVD controller (DVD) 912 which stores, e.g., the boot program, various applications, edited files, user files, and network management program.

A network interface card (NIC) 908 can exchange data with the network devices 971, 972, and 973 and clients 961, 962, and 963 via the network 570 such as a LAN.

(Explanation of Integrated Management Application)

Figure 10A:
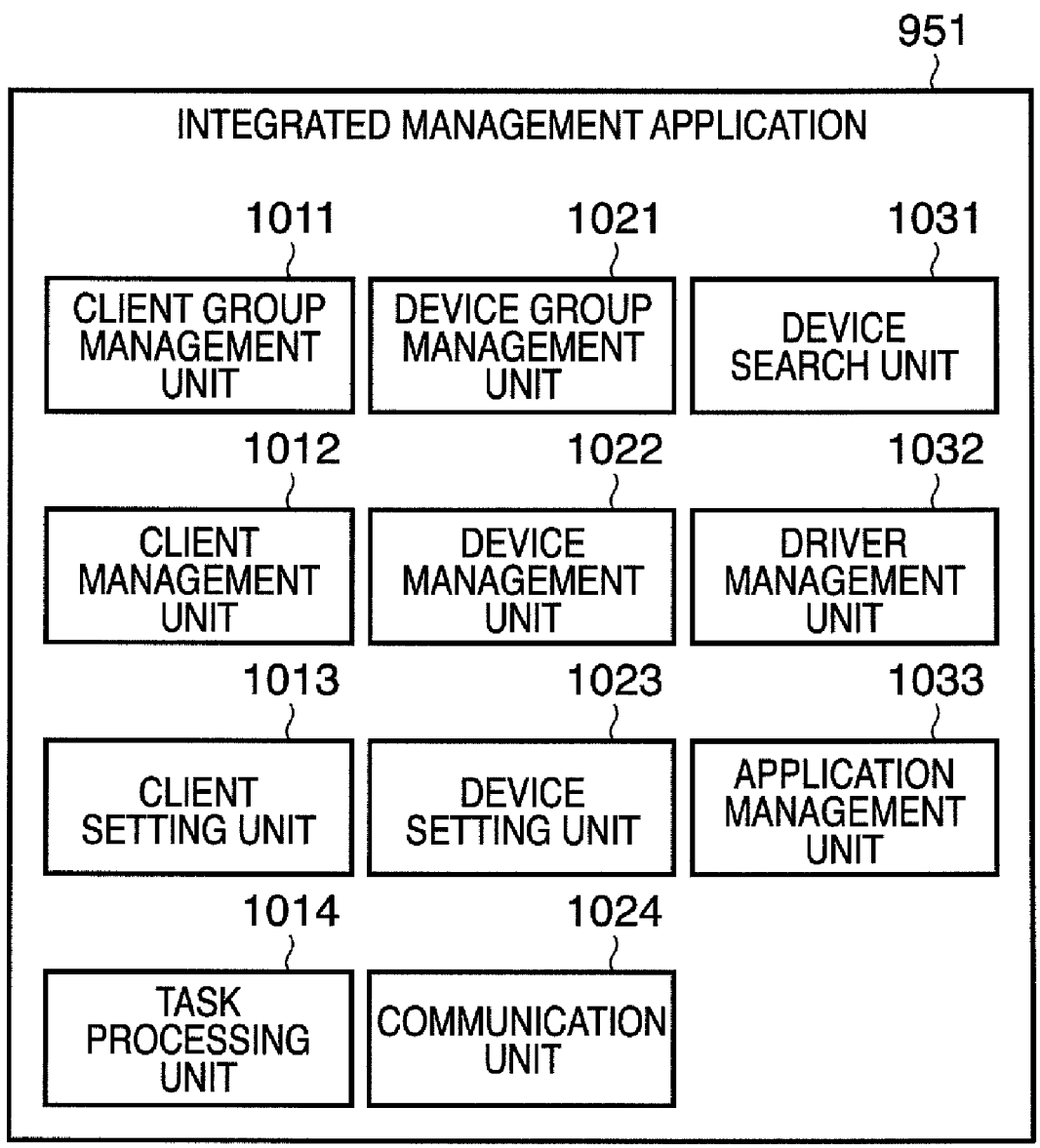
FIG. 10A is a block diagram showing the arrangement of an integrated management application.

FIG. 10A is a block diagram showing the arrangement of the integrated management application. The integrated management application 951 has a client group management unit 1011, client management unit 1012, client setting unit 1013, and task processing unit 1014. The integrated management application 951 also has a device group management unit 1021, device management unit 1022, device setting unit 1023, and communication unit 1024. The integrated management application 951 also has a device search unit 1031, driver management unit 1032, and application management unit 1033.

A client group indicates a unit of management corresponding to, e.g., a department managed by the client group management unit 1011. A client group includes at least one client PC. The client group management unit 1011 can manage clients by grouping them in correspondence with, e.g., the departments of a company. The client group management unit 1011 communicates with each client on the network 570, executes grouping on the basis of the communication result, and stores, in the HD 911 of the server PC 950, group information and the information of each client included in the groups. It is possible to manage groups on the basis of not the departments of a company but, e.g., client installation areas or regions.

FIG. 10B is a view showing an example of a list of clients managed in groups. A client group A includes the clients 961 and 962. A client group B includes the client 963.

Each of the clients 961, 962, and 963 indicates a terminal on which a user executes printing by using an application. Each client has the arrangement of the server PC 950 described with reference to FIG. 9A and additionally includes a driver setting unit 1091 and an installation unit 1092.

The driver setting unit 1091 changes the setting information of a printer driver. The driver setting unit 1091 can change, e.g., setting information described in a registry, and for example, default print settings such as use of the double-sided printing function and 4-in-1 printing.

The installation unit 1092 receives, from the integrated management application 951, an installation set of a new printer driver and application to be push-installed and installs them in a network device.

The client management unit 1012 manages the information of each client. The client management unit 1012 holds information about each client, including the network address (e.g., IP address) of each client, the user, drivers installed to control the network device, and applications. The HD 911 of the server PC 950 stores information about each client.

The client setting unit 1013 can change the driver setting of each client and push-install a driver and application.

The client setting unit 1013 can change the driver setting or push-install a driver and application in the clients of a group at once or in each client.

A device group indicates a unit of management executed by the device group management unit 1021. A device group includes at least one network device. The device group management unit 1021 can manage network devices by grouping them. The device group management unit 1021 communicates with each network device on the network 570, executes grouping on the basis of the communication result, and stores, in the HD 911 of the server PC 950, group information and the information of each network device included in the groups. It is possible to manage groups on the basis of not the departments of a company but, e.g., the function of a network device, e.g., a simple printer, simple scanner, or a multifunctional peripheral with printer and scanner functions, like a client.

FIG. 10C is a view showing an example of a list of network devices managed in groups. A network device group (device group) A includes the network device 971. A device group B includes the network device 972. A device group C includes the network device 973.

The device management unit 1022 holds information of each network device. The device management unit 1022 holds information about each network device, including the network address (e.g., IP address), location information, and option configuration of each network device. The HD 911 of the server PC 950 stores information about each network device.

The device setting unit 1023 can execute device information setting and event registration in a network device by using a protocol such as SNMPv1 or SNMPv3.

The device search unit 1031 searches for, e.g., a network device or client on the network 570 and stores the found network device or client in the HD 911 of the server PC 950.

The driver management unit 1032 manages the installation set of a driver. The application management unit 1033 manages the installation set of an application.

The communication unit 1024 communicates with a network device by using a protocol such as SNMPv1 or SNMPv3. The task processing unit 1014 executes a task to be processed by the device search unit 1031 and driver management unit 1032 and notifies the respective units of the contents of the task in accordance with the task type.

Figure 11:
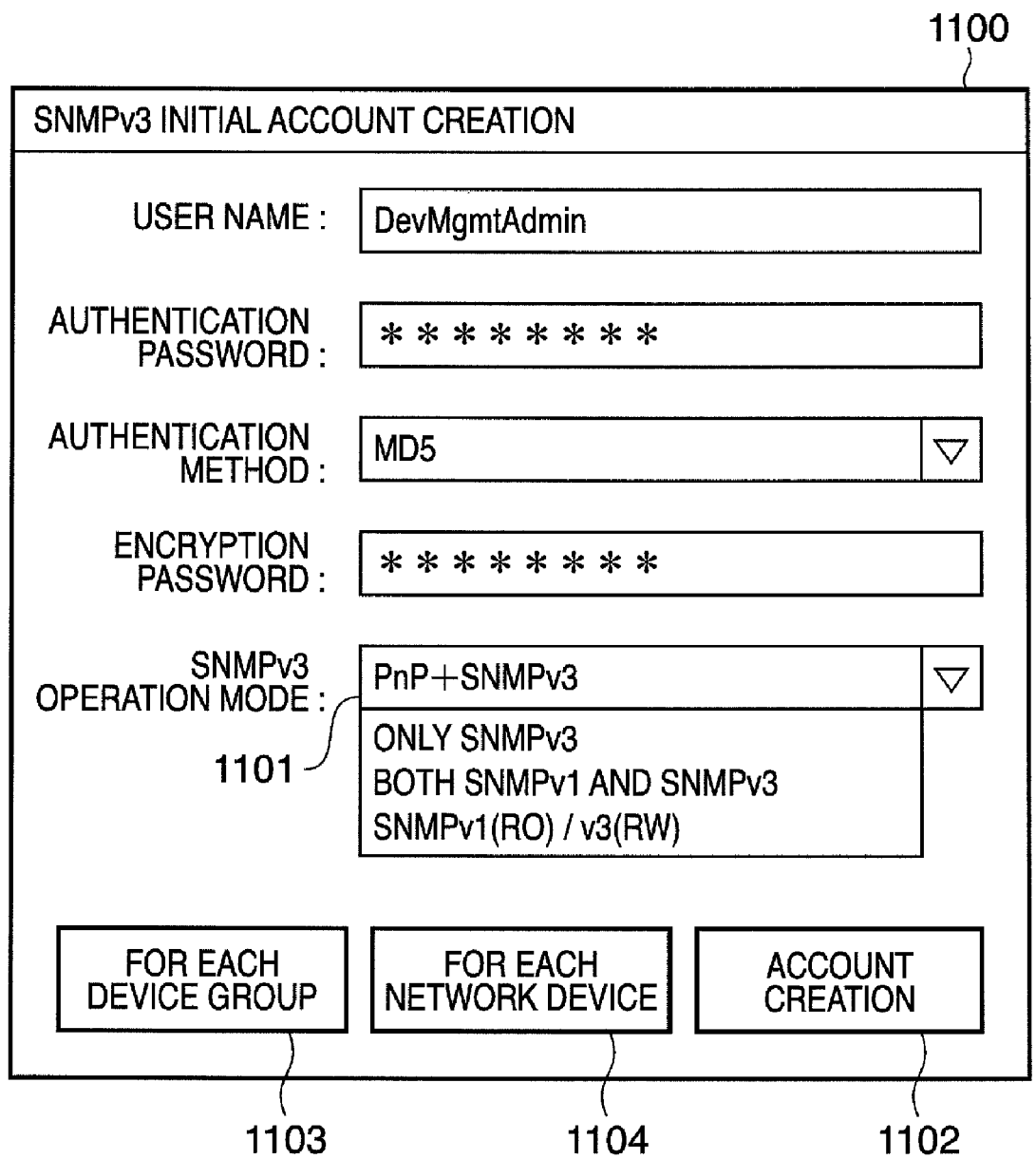
FIG. 11 is a view showing an example of an SNMPv3 initial account setting window in the device management unit of the integrated management application.
Figure 12:
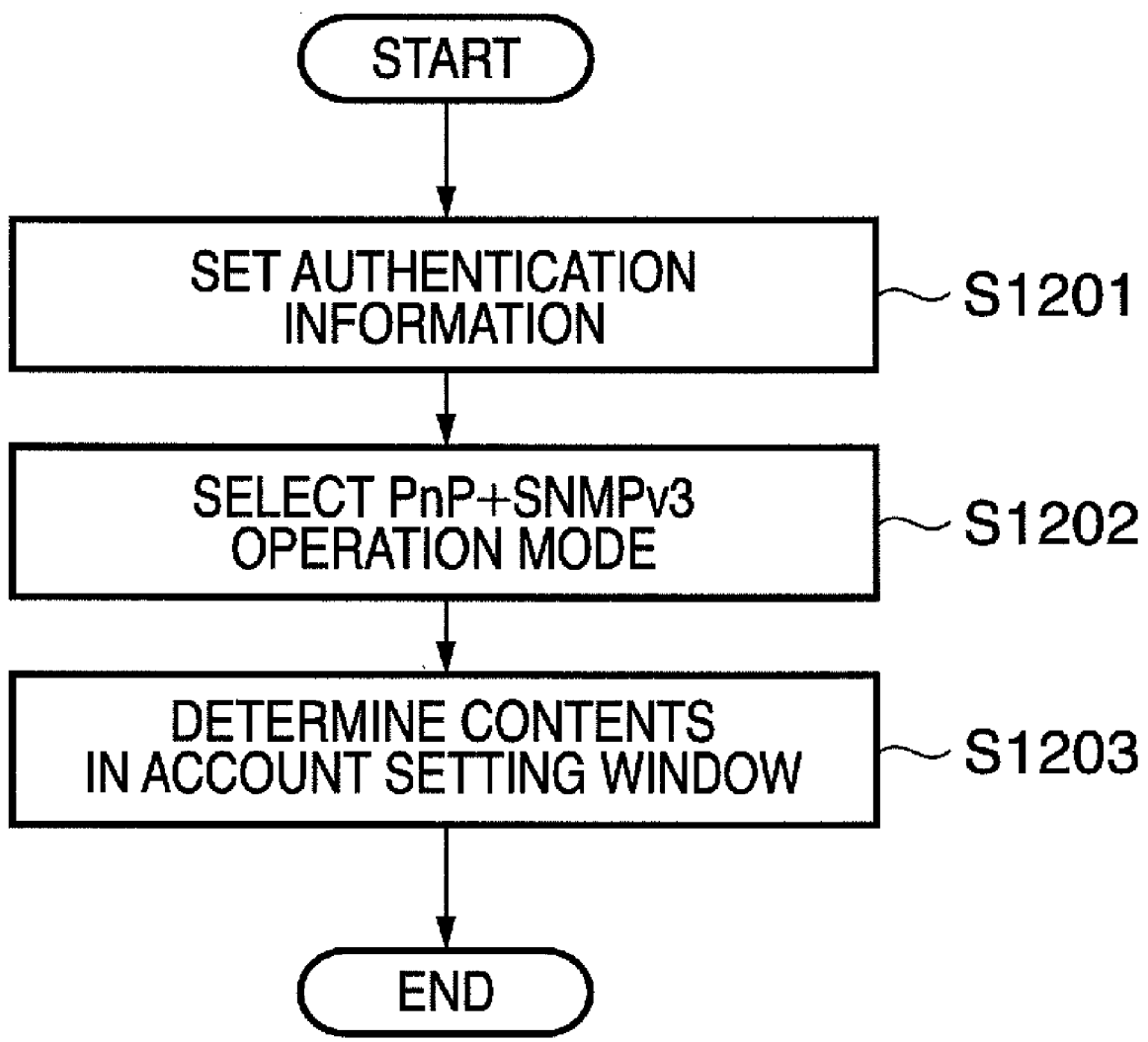
FIG. 12 is a flowchart for explaining the flow of SNMPv3 initial account setting.

FIG. 12 is a flowchart for explaining the flow of SNMPv3 initial account setting. FIG. 11 is a view showing an example of an SNMPv3 initial account setting window in the device management unit 1022 of the integrated management application 951.

In step S1201, authentication information is set. To communicate with a network device by using the SNMPv3 protocol, a user name, a password to be used for authentication, an algorithm (authentication method) to be used for authentication, and a password to be used for packet encryption/description are set.

In step S1202, an SNMPv3 operation mode is selected from a combo box 1101 of the setting window shown in FIG. 11. In the example shown in FIG. 11, (PnP+SNMPv3) is selected as an operation mode to "operate the SNMPv1 protocol only in PnP" and "operate the SNMPv3 protocol in normal communication". Alternatively, the user can select one of "only SNMPv3", "SNMPv1 and SNMPv3", and "SNMPv1 for read only (RO) and SNMPv3 for read and write (RW)" as the operation mode.

The user can select "each device group" 1103 or "each network device" 1104 as the setting of the operation mode. If the user selects "each device group" 1103, the SNMPv3 operation mode can be set for, e.g., each of the device groups A, B, and C (FIG. 10C). If the user selects "each network device" 1104, the SNMPv3 operation mode can be set for, e.g., each network device found on the network 570.

In step S1203, when the user clicks on an account creation button 1102, the settings of an initial account setting window 1100 are determined. The process of the flowchart shown in FIG. 13 is executed under the control of, e.g., the CPU 901.

Figure 13:
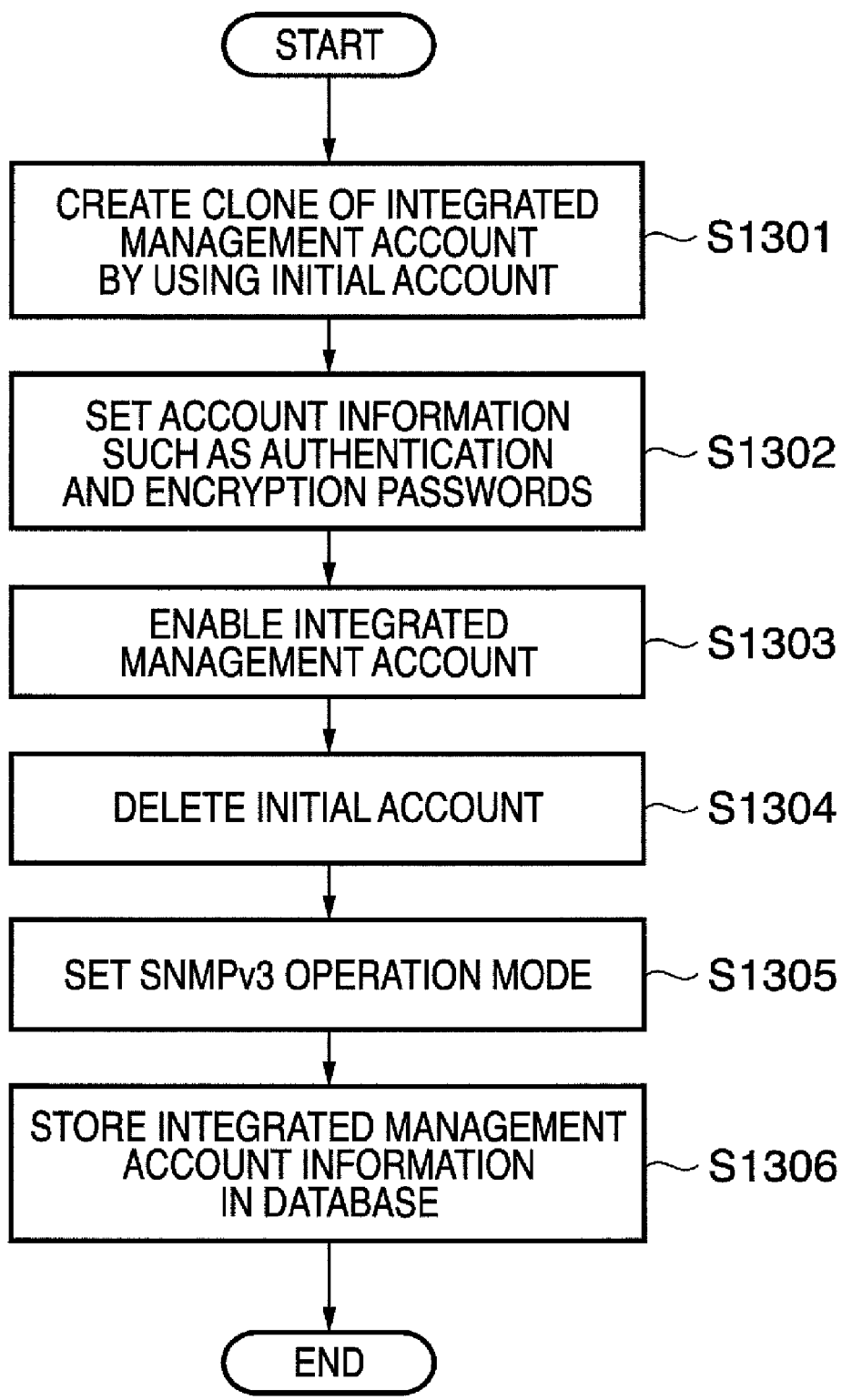
FIG. 13 is a flowchart for explaining the process flow of the server PC when the user clicks on an account creation button in the SNMPv3 initial account setting window.

FIG. 13 is a flowchart for explaining the process flow of the server PC 950 when the user clicks on the account creation button 1102 in the SNMPv3 initial account setting window. This process is executed under the total control of the CPU 901.

In step S1301, the account (integrated management account) of the integrated management application is created by using an initial account preset in the network device with SNMPv3. More specifically, a copy (clone) of the initial account is created.

In step S1302, the authentication password and encryption password set in the above-described SNMPv3 initial account setting window (FIG. 11) are set in the copy of the initial account.

In step S1303, the copy of the initial account (integrated management account) is enabled.

In step S1304, the initial account is deleted.

In step S1305, the operation mode of SNMPv3 is set by using the integrated management account enabled in step S1303. In the setting shown in FIG. 11, (PnP+SNMPv3) is set. Hence, the operation mode to "operate the SNMPv1 protocol only in PnP" and "operate the SNMPv3 protocol in normal communication" is set.

This setting is used as the default setting of the network device. The server PC 950 can set the integrated management account for each network device or each device group.

In step S1306, the integrated management account information is encrypted and stored in the database provided in the HD 911 of the server PC 950, and the process is ended.

(Setting on Network Device Side)

Figure 6:
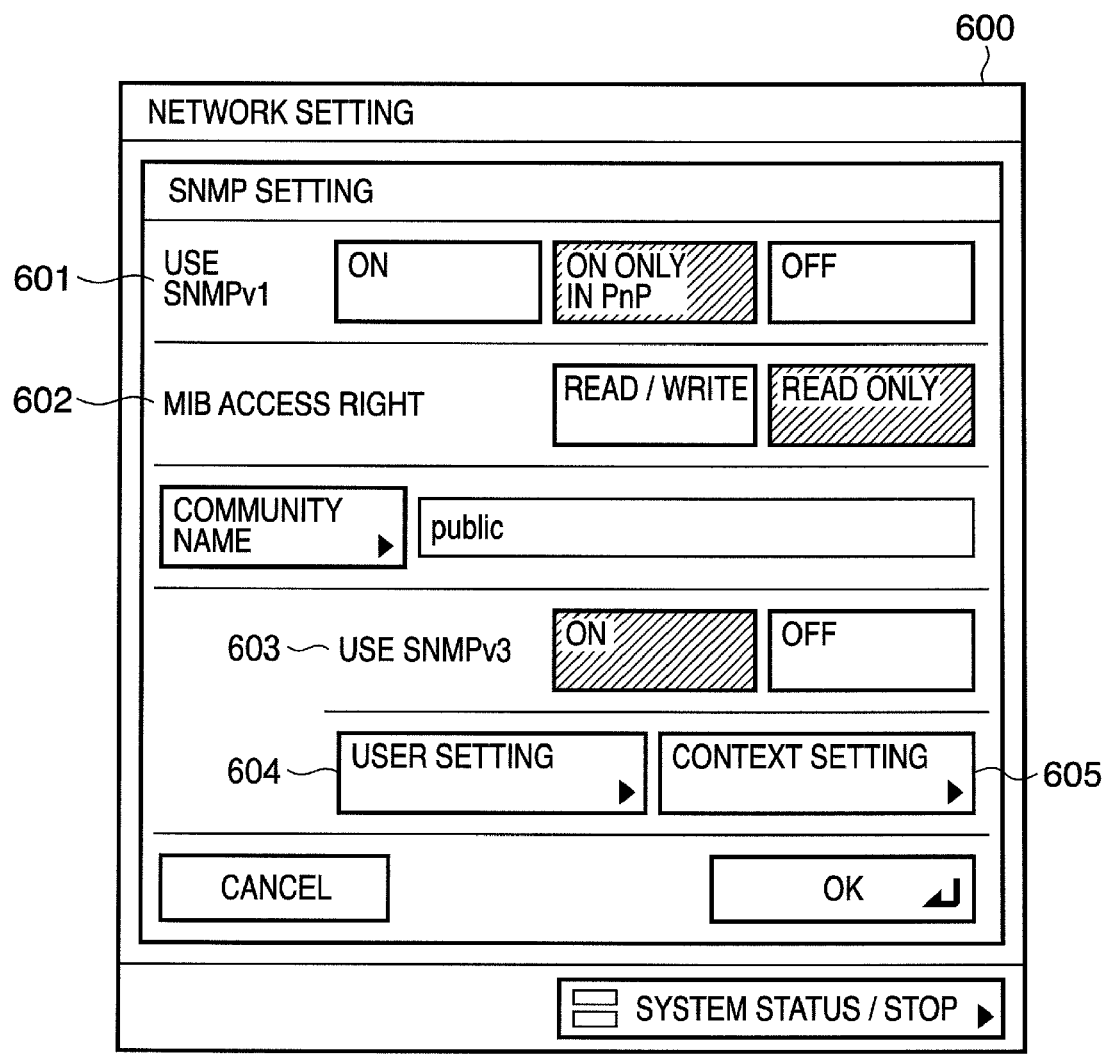
FIG. 6 is a view showing a panel screen provided on the image forming apparatus.

Network setting on a network device (image forming apparatus) side will be described next with reference to FIG. 6. FIG. 6 is a view showing a panel screen 600 provided on the operation unit 504 of the image forming apparatus. The panel screen 600 has setting fields 601, 602, and 603. The CPU 551 of the image forming apparatus can control communication complying with the network protocol on the basis of settings in the setting fields.

The setting field 601 controls communication related to the SNMPv1 protocol. The CPU 551 can control communication related to the SNMPv1 protocol on the basis of the setting in the setting field 601. As communication control setting related to the SNMPv1 protocol, "communicate by the SNMPv1 protocol (ON)", "communicate by the SNMPv1 protocol for only PnP (ON for only PnP)", and "not communicate by the SNMPv1 protocol (OFF)" can be set.

The setting field 602 controls access to the MIB. The CPU 551 can control access to the MIB on the basis of the setting in the setting field 602. As setting of access control to the MIB, "read/write (Read/Write right)", "read only (Read Only right)", and "community name" can be set.

For example, when "communicate by the SNMPv1 protocol for only PnP (ON for only PnP)" is set, the image forming apparatus returns a response to only MIB objects in the MIB object list shown in FIG. 7 in response to an inquiry from the manager. The image forming apparatus (device) returns no response to MIB objects that are not included in the MIB object list shown in FIG. 7.

FIG. 7 is a view showing a list of MIB objects to be used in a Plug and Play mode. In response to an MIS acquisition request from the operating system, the device returns the information of MIB group 1 having a prefix "sys" or "hr".

An object "sysDescr" represents the device name; "hrDeviceStatus", "hrPrinterStatus", and "hrPrinterDetectedErrorStatus", the statuses of the device and printer; "hrMemorySize" and "hrStorageTypes", the memory size information of the RAM or hard disk incorporated in the device; and "prtMediaPathType", the enable/disable information of double-sided printing.

Next, in response to another MIB acquisition request from the operating system, the device returns the information of MIB group 2 having a prefix "ppm".

An object "ppmGeneralNaturalLanguage" represents the information of the language used by the device; "ppmGeneralNumberOfPrinters" and "ppmGeneralNumberOfPorts", the number of printer objects and the number of ports to the generated in the Plug and Play mode; and "ppmPrinterName", the printer object name. This information is reflected on a printer name (iR1234, iR1235, or iR1236) as shown in FIG. 14. An object "ppmPrinterIEEE1284DeviceId" is an identifier to identify the printer driver used by the device. On the basis of these pieces of information, the operating system installs the printer driver.

An object "ppmPrinterNumberOfPorts" represents the number of ports corresponding to the printer. If printing is to be distributed to a plurality of ports, this object has a value of 2 or more. An object "ppmPrinterPreferredPortsIndex" is an identifier indicating the information of a port to be preferentially used. The port information is represented by MIB objects with a prefix "ppmPort" in FIG. 7. An object "ppmPrinterHrDeviceIndex" is the value of "hrDeviceIndex", which is reflected on the SNMP device index shown in FIG. 15. An object "ppmPrinterSnmpCommunityName" represents a community name used in SNMP communication, which is reflected on the community name shown in FIG. 15.

An object "ppmPrinterSnmpQueryEnabled" represents whether to enable status acquisition by SNMP, which is reflected on ON/OFF of the check box to enable the SNMP status in FIG. 15.

An object "ppmPortEnabled" represents whether a port is enabled; "ppmPortName", the port name which is reflected on the port name in FIG. 15; and "ppmPortServiceNameOrURI", the URI of the print destination. When the print destination is designated using a DNS name, the DNS name is input to the printer name or IP address in FIG. 15. At this time, the value of the MIB object is reflected on the printer name or IP address in FIG. 15.

An object "ppmPortProtocolType" indicates the port type, which is used as information to select the radio button "Raw" or "LPR" of the protocol group in FIG. 15. An object "ppmPortProtocolTargetPort" indicates the port number of the print destination. The value is 9100 in the example shown in FIG. 15. An object "ppmPortProtocolAltSourceEnabled" is used to switch the port number. An object "ppmPortPrtChannelIndex" has the value of "PrtChannelIndex" of "Printer MIB v2". An object "ppmPortLprByteCountEnabled" is reflected on information in the check box to enable LPR byte count of LPR setting.

The setting field 603 controls communication related to the SNMPv3 protocol. The CPU 551 can control communication by the SNMPv3 protocol on the basis of the setting in the setting field 603. As setting of communication control related to the SNMPv3 protocol, "communicate by the SNMPv3 protocol (ON)" and "not communicate by the SNMPv3 protocol (OFF)" can be set.

Security settings unique to the SNMPv3 protocol are also possible by using an authentication password, an encryption password, and the like in a user setting 604 and a context setting 605.

Even when "communicate by the SNMPv3 protocol (ON)" is set, communication using both the SNMPv1 protocol and SNMPv3 protocol can be done by setting "communicate by the SNMPv1 protocol (ON)".

When only the SNMPv3 protocol is set, the simple PnP function cannot be used. However, the simple PnP function by the Standard TCP/IP Port Monitor can be used by setting "communicate by the SNMPv1 protocol for only PnP (ON for only PnP)".

Figure 4:
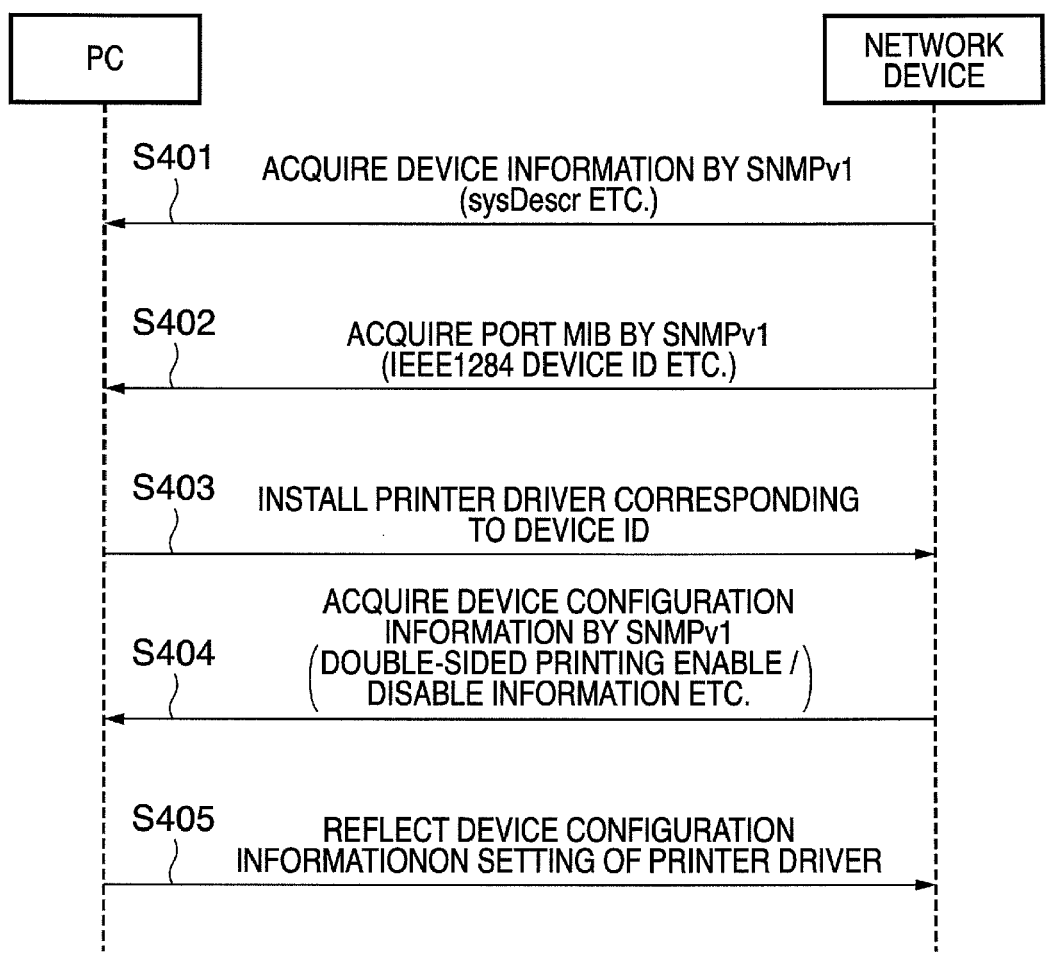
FIG. 4 is a sequence chart showing the Plug and Play sequence between a client and a network device.

FIG. 4 is a sequence chart showing the Plug and Play sequence between a client (information processing apparatus: PC) and a network device (image forming apparatus). In step S401, the Standard TCP/IP Port Monitor (to be referred to as "TcpMon" hereinafter) on the PC acquires the product name (e.g., sysDescr) from the network device by SNMPv1.

In step S402, the TcpMon acquires, e.g., an IEEE1284 device ID (to be referred to as a "device ID" hereinafter) defined in the Port Monitor MIB from the network device by SNMPv1.

In step S403, the OS of the PC selects a printer driver on the basis of the device ID and installed the printer driver.

In step S404, the TcpMon acquires device configuration information (e.g., the enable/disable information of double-sided printing). In step S405, the TcpMon reflects the acquired device configuration information on the setting of the printer driver installed in step S403. In the above description, MIB information acquisition from the network device by the TcpMon is done exclusively by using the SNMPv1 protocol.

When the SNMPv1 is used for only PnP, the user can automatically install the printer driver from the client and reflect the configuration information of the network device on the setting of the printer driver.

(Process of Image Forming Apparatus)

Figure 8:
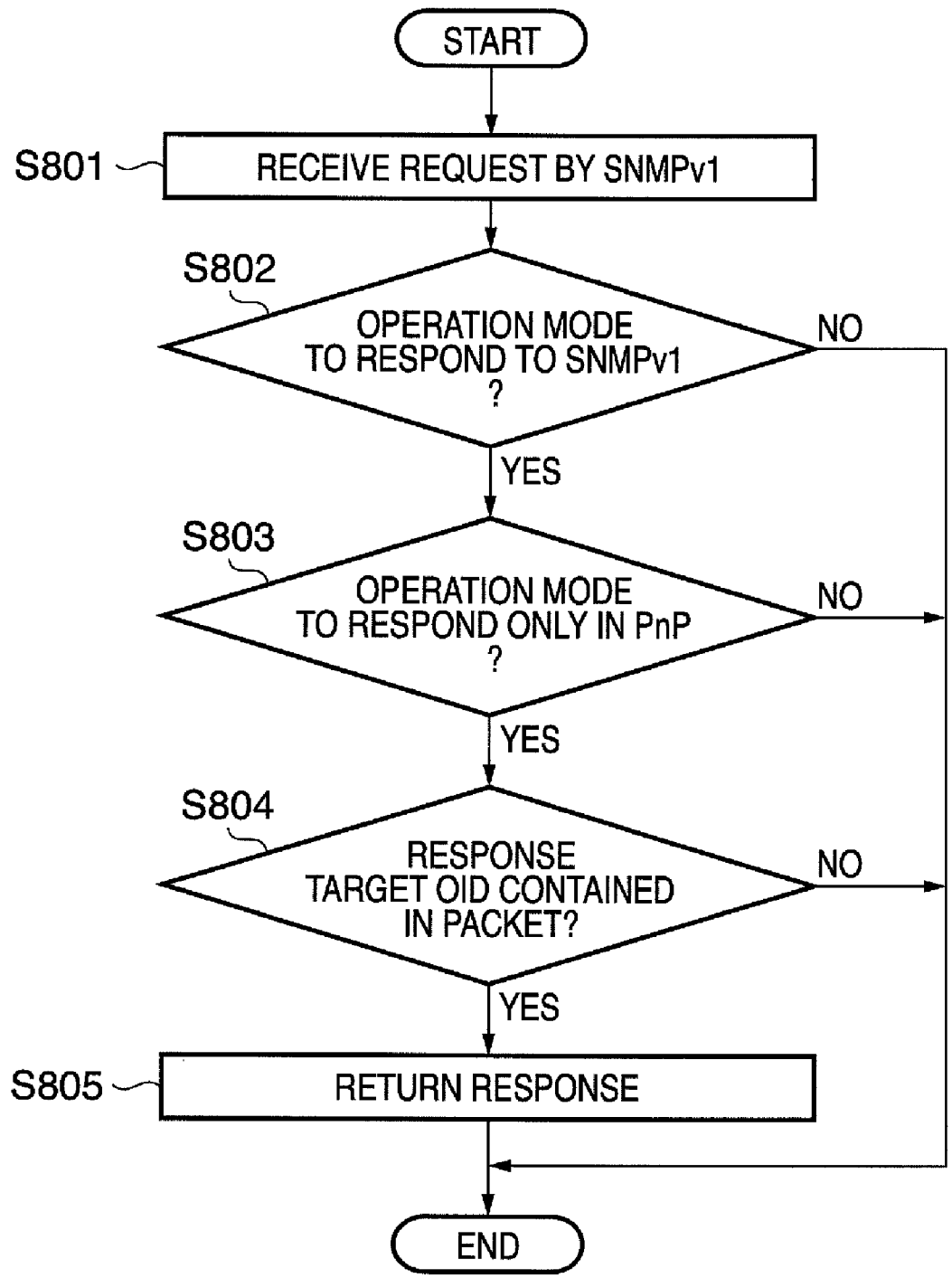
FIG. 8 is a flowchart for explaining the process flow of the image forming apparatus.

FIG. 8 is a flowchart for explaining the process flow of the image forming apparatus. This process is executed under the total control of the CPU 551.

In step S801, the image forming apparatus receives a request packet (SNMPv1 request 103 in FIG. 1) by the SNMPv1 protocol via the network I/F 554. The request packet by the SNMPv1 protocol contains requests (OID1, OID2, . . . ) each of which is identified by object identification information (identifier) (Object Identifier: OID).

In step S802, the CPU 551 of the image forming apparatus determines whether the operation mode to respond to the SNMPv1 protocol is set in the SNMPv3 operation mode. If the CPU 551 determines in step S802 that the operation mode (not communicate by the SNMPv1 protocol (OFF)) not to respond to the SNMPv1 protocol is set (NO in step S802), the process is ended. On the other hand, if the CPU 551 determines in step S802 that the operation mode to respond to the SNMPv1 protocol is set (YES in step S802), the process advances to step S803.

In step S803, the CPU 551 of the image forming apparatus determines whether the operation mode (ON only in PnP) to respond only in PnP is set in the SNMPv3 operation mode. If the CPU 551 determines in step S803 that (ON only in PnP) is not set (NO in step S803), the process is ended. On the other hand, it the CPU 551 determines in step S803 that (ON only in PnP) is set (YES in step S803), the process advances to step S804.

In step S804, the CPU 551 analyzes the object identification information (identifiers) (OID1, OID2, ...) contained in the request packet (SNMPv1 request 103) transmitted from the manager. The CPU 551 determines whether each request is a response target (object) necessary for Plug and Play. The CPU 551 determines, e.g., whether each of the object identifiers (OID1, OID2, ...) corresponds to an MIB object in the MIB object list shown in FIG. 7. If an identifier corresponds to an object (YES in step S804), the process advances to step S805. If no object identifier corresponds to a response target object identifier (NO in step S804), the process is ended.

In step S805, the CPU 551 generates a response packet containing, of the MIB objects in the list shown in FIG. 7, only MIB objects necessary for Plug and Play and returns the packet to the manager of the client 101 (SNMPv1 response 104 in FIG. 1).

According to this embodiment, the user can use the simple PnP function in a specific OS (e.g., Windows® Vista) by using the SNMPv3 operation mode (PnP+SNMPv3) corresponding to the PnP function.

With the simple PnP function, the user can install a printer driver from the client. It is also possible to reflect the configuration information of the network device on the setting of the printer driver.

(Other Embodiments)

The object of the present invention can also be achieved by supplying a storage medium which records software program codes for implementing the functions of the above-described embodiment to a system or apparatus. The object is also achieved by causing the computer (or CPU or MPU) of the system or apparatus to read out and execute the program codes stored in the storage medium.

In this case, the program codes read out from the storage medium implement the functions of the above-described embodiment by themselves, and the storage medium which stores the program codes constitutes the present invention.

Examples of the storage medium to supply the program codes are a flexible disk, hard disk, optical disk, magnetooptical disk, CD-ROM, CD-R, nonvolatile memory card, and ROM.

The functions of the above-described embodiment are implemented when the computer executes the readout program codes. The functions of the above-described embodiment are also implemented when the OS (Operating System) running on the computer partial or wholly executes actual processing on the basis of the instructions of the program codes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-307225, filed Nov. 13, 2006, which is hereby incorporated by reference herein in its entirety.

What is claimed is:

1. A network device having a processor which executes a program for controlling communication with an information processing apparatus on a network, the device comprising:
    a communicator adapted to communicate with the information processing apparatus by using a first communication protocol requiring authentication when accessing configuration information of a network device and a second communication protocol requiring no authentication;
    a determination unit adapted to determine whether a request received from the information processing apparatus requests a part of the configuration information related to Plug and Play; and
    a communication controller adapted to (i) transmit, to the information processing apparatus which has transmitted the request, the part of configuration information by using the second communication protocol when said determination unit determines that the request received from the information processing apparatus requests the part of the configuration information related to the Plug and Play, and (ii) transmit, to the information processing apparatus, a response to the request by using the first communication protocol without transmitting the response to the request by using the second communication protocol when said determination unit determines that the request received from the information processing apparatus does not request the configuration information related to the Plug and Play,
    wherein it is set in advance, as an operation mode of said communicator, that the second communication protocol is used in a response to a request only for the configuration information related to the Plug and Play, and the first communication protocol is used in a response to a request other than the request for the configuration information related to the Plug and Play.

2. The device according to claim 1, wherein the configuration information is MIB (Management Information Base) information of SNMP, and
    said determination unit determines, using identification information of the MIB information, whether the request received from the information processing apparatus requests the configuration information related to the Plug and Play.

3. The device according to claim 2, further comprising a device information storage unit adapted to store the MIB information concerning a state of the network device.

4. The device according to claim 2, wherein said communicator generates a response packet containing the configuration information necessary for the Plug and Play on the basis of the MIB information and returns the response packet to the information processing apparatus by using the second communication protocol.

5. A network device management apparatus having a processor which executes a program for managing a network device on a network, the apparatus comprising:
    an authentication information setting unit adapted to set authentication information related to a first communication protocol;
    an operation mode setting unit adapted to set an operation mode so as to communicate only with an object necessary for Plug and Play by using a second communication protocol requiring no authentication and communicate with an object other than the object necessary for Plug and Play by using the first communication protocol; and
    a network device setting unit adapted to set, in the network device, settings by said authentication information setting unit and said operation mode setting unit,
    wherein the network device (i) responds to a request only for the configuration information necessary for the Plug and Play by using the second communication protocol according to the setting, and (ii) responds to a request other than the request for the configuration information necessary for the Plug and Play by using the first communication protocol according to the setting.

6. The apparatus according to claim 5, wherein said network device setting unit executes setting in each device group including the network device or in each network device.

7. A network device control method comprising the steps of:
communicating with an information processing apparatus on a network by using a first communication protocol requiring authentication when accessing configuration information of a network device and a second communication protocol requiring no authentication;
determining whether a request received from the information processing apparatus requests a part of the configuration information related to Plug and Play; and
(i) transmitting, to the information processing apparatus which has transmitted the request, the part of configuration information by using the second communication protocol when it is determined in the determining step that the request received from the information processing apparatus requests the part of the configuration information related to the Plug and Play, and (ii) transmitting, to the information processing apparatus, a response to the request by using the first communication protocol without transmitting the response to the request by using the second communication protocol when it is determined in the determining step that the request received from the information processing apparatus does not request the configuration information related to the Plug and Play,
wherein it is set in advance, as an operation mode of said communicating step, that the second communication protocol is used in a response to a request only for the configuration information related to the Plug and Play, and the first communication protocol is used in a response to a request other than the request for the configuration information related to the Plug and Play.

8. The method according to claim 7, wherein
the configuration information is MIB (Management Information Base) information of SNMP, and
in the determining step, it is determined, using identification information of the MIB information, whether the request received from the information processing apparatus requests the configuration information related to the Plug and Play.

9. The method according to claim 8, further comprising the step of storing, in a storage unit, the MIB information about a state of the network device.

10. The method according to claim 8, wherein in the communicating step a response packet containing the configuration information necessary for the Plug and Play is generated on the basis of the MIB information and returned to the information processing apparatus by using the second communication protocol.

11. A network device management method comprising the steps of:
setting authentication information related to a first communication protocol;
setting an operation mode so as to communicate only with an object necessary for Plug and Play by using the second communication protocol requiring no authentication and communicate with an object other than the object necessary for Plug and Play by using the first communication protocol; and
setting, in a network device, settings in the authentication information setting step and the operation mode setting step,
wherein the network device (i) responds to a request only for the configuration information necessary for the Plug and Play by using the second communication protocol according to the setting, and (ii) responds to a request other than the request for the configuration information necessary for the Plug and Play by using the first communication protocol according to the setting.

12. The method according to claim 11, wherein in the network device setting step, setting is executed in each device group including the network device or in each network device.

13. A non-transitory computer-readable medium including a program which causes a computer to execute a network device control method, the method comprising the steps of:
communicating with an information processing apparatus on a network by using a first communication protocol requiring authentication when accessing configuration information of a network device and a second communication protocol requiring no authentication;
determining whether a request received from the information processing apparatus requests a part of the configuration information related to Plug and Play; and
(i) transmitting, to the information processing apparatus which has transmitted the request, the part of configuration information by using the second communication protocol when it is determined in the determining step that the request received from the information processing apparatus requests the part of the configuration information related to the Plug and Play, and (ii) transmitting, to the information processing apparatus, a response to the request by using the first communication protocol without transmitting the response to the request by using the second communication protocol when it is determined in the determining step that the request received from the information processing apparatus does not request the configuration information related to the Plug and Play,
wherein it is set in advance, as an operation mode of said communicating step, that the second communication protocol is used in a response to a request only for the configuration information related to the Plug and Play, and the first communication protocol is used in a response to a request other than the request for the configuration information related to the Pluq and Play.

14. A non-transitory computer-readable medium including a program which causes a computer to execute a network device management method, the method comprising the steps of:
setting authentication information related to a first communication protocol;
setting an operation mode so as to communicate only with an object necessary for Plug and Play by using the second communication protocol requiring no authentication and communicate with an object other than the object necessary for Plug and Play by using the first communication protocol; and
setting, in a network device, settings in the authentication information setting step and the operation mode setting step,
wherein the network device (i) responds to a request only for the configuration information necessary for the Pluq and Play by using the second communication protocol according to the setting, and (ii) responds to a request other than the request for the configuration information necessary for the Pluq and Play by using the first communication protocol according to the setting.

* * * * *